United States Patent
Choi

(10) Patent No.: US 10,924,523 B2
(45) Date of Patent: *Feb. 16, 2021

(54) ENCODINGLESS TRANSMUXING

(71) Applicant: Verizon Digital Media Services Inc., Dulles, VA (US)

(72) Inventor: Seungyeob Choi, Northridge, CA (US)

(73) Assignee: Verizon Digital Media Services Inc., Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/520,042

(22) Filed: Jul. 23, 2019

(65) Prior Publication Data
US 2019/0356711 A1    Nov. 21, 2019

Related U.S. Application Data

(63) Continuation of application No. 15/222,054, filed on Jul. 28, 2016, now Pat. No. 10,367,865.

(51) Int. Cl.
    *H04L 29/06*    (2006.01)
(52) U.S. Cl.
    CPC ...... *H04L 65/4069* (2013.01); *H04L 65/4084* (2013.01); *H04L 65/605* (2013.01); *H04L 65/607* (2013.01); *H04L 65/80* (2013.01)
(58) Field of Classification Search
    CPC ............. H04L 65/4069; H04L 65/4084; H04L 65/605; H04L 65/607; H04L 65/80
    See application file for complete search history.

(56) References Cited

U.S. PATENT DOCUMENTS

| | | | |
|---|---|---|---|
| 6,804,301 B2 | 10/2004 | Wu et al. |
| 8,806,050 B2 | 8/2014 | Chen et al. |
| 8,879,856 B2 | 11/2014 | Raveendran et al. |
| 2008/0259799 A1 | 10/2008 | van Beck |
| 2010/0027961 A1 | 2/2010 | Gentile et al. |
| 2011/0080940 A1 | 4/2011 | Bocharov et al. |
| 2011/0119395 A1 | 5/2011 | Ha et al. |
| 2013/0279605 A1 | 10/2013 | Krig |
| 2014/0164575 A1 | 6/2014 | Wang et al. |
| 2015/0222681 A1 | 8/2015 | Basile |
| 2016/0226529 A1 | 8/2016 | Dung Dao et al. |

*Primary Examiner* — Thomas J Dailey
(74) *Attorney, Agent, or Firm* — Ansari Katiraei LLP; Arman Katiraei; Sadiq Ansari

(57) ABSTRACT

An encodingless transmuxer produces a manifest file and segments for streaming media content over different streaming protocols without encoding or otherwise modifying the binary data from the original encoding of the media content file. The transmuxer detects key frame positions from the media content file metadata. The transmuxer maps segment start times to a subset of the identified key frames based on a segment duration parameter. The transmuxer generates a manifest file listing the segments with each segment identifier comprising a timestamp specifying a time offset for the key frame at which the segment commences. In response to a request for a particular segment, the transmuxer or a streaming server copies or reuses from the original media content file, the binary data for the key frame that commences the particular segment up to the bit immediately before the start of the next segment key frame.

20 Claims, 8 Drawing Sheets

ENCODINGLESS TRANSMUXING

CLAIM OF BENEFIT TO RELATED APPLICATIONS

This application is a continuation of U.S. nonprovisional application Ser. No. 15/222,054 entitled "Encodingless Transmuxing", filed Jul. 28, 2016, now U.S. Pat. No. 10,367,865. The contents of application Ser. No. 15/222,054 are hereby incorporated by reference.

BACKGROUND ART

Streaming media content over a digital network involves transmuxing. Transmuxing allows the same media content to be streamed to different devices and device types with different streaming protocols. Media content is first encoded into a digital file, such as an mp4 file (i.e., MPEG-4 file). The encoded media file is then transmuxed in order to be transmitted to different platforms using the HyperText Transfer Protocol (HTTP) Live Streaming or HLS protocol, the Dynamic Adaptive Streaming over HTTP or DASH protocol, the HTTP Dynamic Streaming or HDS protocol, or other streaming protocols.

Transmuxing involves producing a manifest file and splitting the original media file (i.e., the mp4 file) into different segments that can be separately passed to a media playback application. The manifest file lists the different segments. The manifest also specifies a correspondence between the different segments and the media content playback times. The manifest file is sent to a client player requesting the media content. Based on the manifest, the client player can begin to request the segments in order to playback the media content from the beginning or request different segments to advance playback of the media content to particular points in time.

Since the client player can begin or advance playback by requesting any segment specified in the manifest file, each of the segments in the manifest must commence with a key frame or I-frame. The key frame can be rendered using only the information in the key frame without referencing any information from other frames in the same segment or a different segment. This contrasts with P-frames or B-frames that reference information from frames before or after, and are therefore incomplete by themselves. Encoders intermix I, P, B, and other frame types to reduce media file size, thereby allowing the media file to be transferred with less data than if every frame was a key frame or I-frame.

The intermixing of I, P, B, and other frame types complicates the transmuxing operation. Prior art transmuxers typically produce segments of about equal length. The starting frame of each produced segment is unlikely to correspond to a key frame in the original media content encoding, thereby causing the prior art transmuxers to re-encode the frames falling within each of the produced segments.

FIG. 1 conceptually illustrates the transmuxing problem. The figure conceptually illustrates frames of an encoded media file 110. The figure also illustrates transmuxing the media file into a set of segments 120, 130, and 140. The start of the segments do not necessarily align with existing key frame placement in the media file 110. Therefore, the transmuxing operation involves re-encoding parts of the media file 110 so that each produced segment 120, 130, and 140 starts with a key frame.

Encoding is a computationally intensive operation. This, in turn, limits the number of concurrent streams that a transmuxer can support at any given time, especially when the segment re-encoding occurs dynamically in response to requests from different clients and client devices. A bigger issue is that delays from the transmuxer dynamically encoding the segments anew from the original encoding of the media file can degrade the user experience. Yet another issue with traditional transmuxing is quality loss. Encoding, at any stage, is a lossy process. Therefore, as the transmuxer encodes segments from the already encoded original media content file, the segments will lose quality relative to the original media content file encoding.

Accordingly, there is a need for an improved transmuxer. In particular, there is a need for a transmuxer that can dynamically generate segments in response to client requests without the need to encode or re-encode any part of the originally encoded media content or media file.

BRIEF DESCRIPTION OF THE DRAWINGS

A preferred embodiment for encodingless transmuxing will now be described, by way of example only, with reference to the accompanying drawings in which.

DETAILED DESCRIPTION

Figure 1:
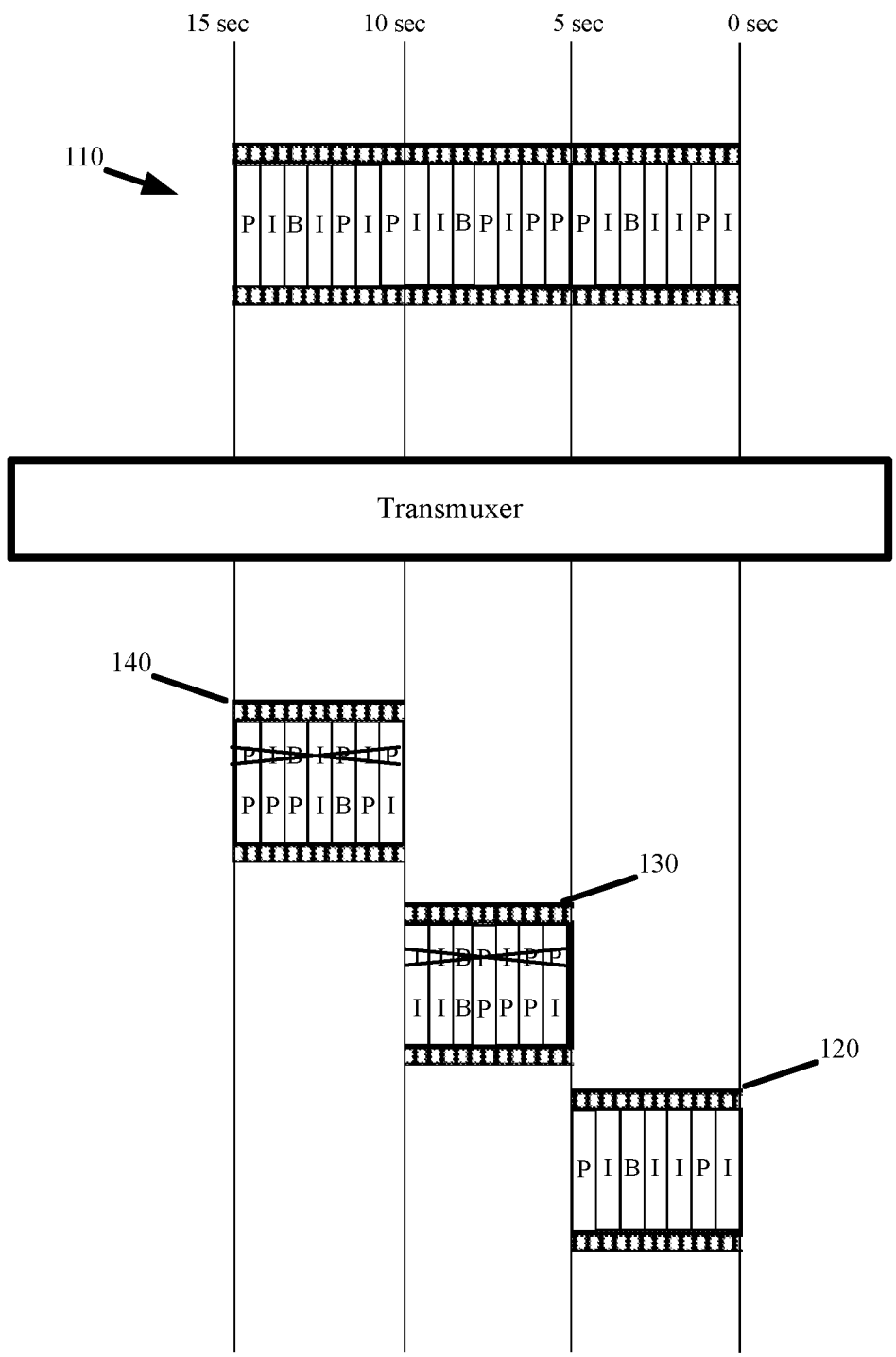
FIG. 1 conceptually illustrates prior art transmuxing whereby parts of a media file are re-encoded so that produced segments commence with a key frame even when the start of each segment does not necessarily align with existing key frame placement in the media file.

To aid in the discussion that is to follow, media content refers to digital content with a temporal duration. Media content can include video, audio, a sequence of text, a sequence of images, a service, or any combination thereof. Media content can be composed of multiple media elements. For instance, media content can be formed with primary video content that is broken up and separated by breaks during which advertisements or other third party content is presented.

The embodiments set forth an encodingless transmuxer. The encodingless transmuxer produces a manifest file and segments for streaming media content over different streaming protocols without encoding, decoding, or otherwise modifying or manipulating the binary data that stores information about the frames of the media content. The encodingless transmuxer produces the stream segments based on key frames present in the original encoding of the media content. More specifically, the encodingless transmuxer finds key frame positions within the original media content encoded file and reuses subsets of the binary data starting at various key frame positions to generate the segments. This ensures that each segment produced by the encodingless transmuxer commences with a key frame without the need to re-encode any part of the original media content encoded file.

The encodingless transmuxer performs transmuxing for and can be used in conjunction with the HyperText Transfer Protocol (HTTP) Live Streaming or HLS protocol, the Dynamic Adaptive Streaming over HTTP or DASH protocol, the HTTP Dynamic Streaming or HDS protocol, the Smooth Streaming protocol, and other streaming protocols. In other words, the encodingless transmuxer and the transmuxing technique implemented by the encodingless transmuxer are not limited to a specific set of streaming protocols and can be adapted to support streaming on a variety of client players and devices. Accordingly, the manifest file, metadata, and segments generated during transmuxing by the encodingless transmuxer of some embodiments can be adapted for streaming with any streaming protocol to any client player or user device. The encodingless transmuxer also requires no change to the client players and the means by which the client players request, render, and playback the streaming content.

The encodingless transmuxer is embodied in at least one server or machine. The encodingless transmuxer machine can also be configured to operate as a streaming server that serves media content in response to user requests for the media content. Thus, the encodingless trasmuxer can perform the transmuxing operations described below as well as stream or send segments to requesting clients.

The elimination of the encoding steps from the manifest file and segment creation significantly improves transmuxing performance of the encodingless transmuxer of some embodiments. In particular, the encodingless transmuxer of some embodiments avoids the processing and resource intensive step of encoding part or all of each generated segment in order for the segment to commence with a key frame. The encodingless transmuxer is therefore ideal for real-time transmuxing in which the manifest and segments are generated dynamically in response to received requests for streaming media content. The encodingless tranmuxer is also ideal for implementation on servers or networks receiving a high volume of requests for streaming media content, and therefore require transmuxing of several streams concurrently. A content delivery network is an example of one such network that benefits from the encodingless transmuxing.

Figure 2:
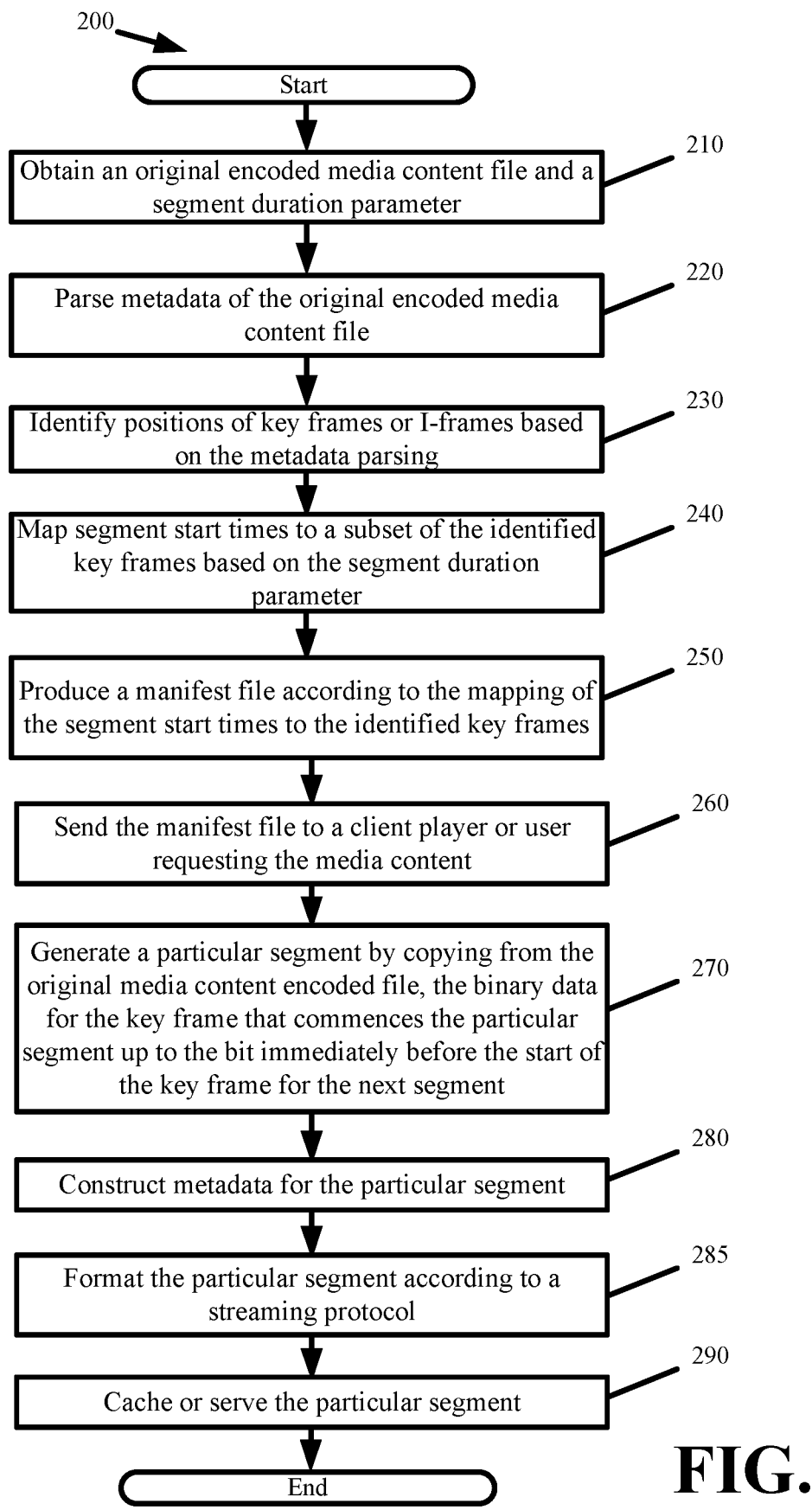
FIG. 2 presents an encodingless transmuxing process in accordance with some embodiments.

FIG. 2 presents an encodingless transmuxing process 200 in accordance with some embodiments. Process 200 is performed by the encodingless transmuxer of some embodiments. Process 200 can be performed in response to receiving a user request for media content when the transmuxing is performed in real-time. Alternatively, process 200 can be performed in advance of a user request when the manifest file and streaming segments are pregenerated.

Process 200 commences by obtaining (at 210) an original encoded media content file for transmuxing and a segment duration parameter. The file can be an mp4 file. The embodiments can be adapted to support other file types. The original encoded media content file can be obtained from a content provider whose media content is the subject of the transmuxing process 200. The segment duration parameter can also be obtained from the content provider. If not provided by the content provider, the segment duration parameter can be a default or preset value. The segment duration parameter specifies a desired segment length for the segments produced as a result of the transmuxing. As will be explained below, the encodingless transmuxer uses the segment duration parameter as a guiding value rather than a strict value for the segment length.

According to standards set forth by the Moving Pictures Experts Group (MPEG), the original encoded media content file stores metadata separately from the binary data. With respect to an mp4 file, the metadata is stored within the "moov" section of the file and the binary data is stored within the "mdat" section of the file. As a result, the metadata can be processed independent of the binary data.

The metadata typically stores information relating to how the binary data is constructed. The metadata can define the frame resolution, media content duration, frames per second, and offsets for the different media content frames as some examples.

The binary data stores the video alone or in conjunction with the audio information for the media content. More specifically, the binary data stores the actual frame information of the media content. The frames comprise an irregular mix of I, P, B, and other frame types. The encoding of the media content as different I, P, B, and other frame types is contingent on the complexity of the media content, amount of motion between frames, and settings of the encoder as some examples.

The process parses (at 220) the metadata of the original encoded media content file. The parsing involves accessing only the moov or metadata section of the media content file without accessing the significantly larger mdat or binary data section of the media content file.

From the parsing, the process identifies (at 230) positions of the key frames or I-frames. In some embodiments, identifying the key frame positions involves identifying the key frame timestamps or playback times at which the key frames occur in the original encoded media content file. The metadata of an mp4 file provides a number sequence (e.g., 1, 3, 19, 35, etc.) that identifies which frames are key frames. A simple computation based on the offset of each frame and the number sequence yields the timestamps for the key frames. A similar computation can be performed from metadata specifying the frames per second and the bytes or number of bits for each frame. In some embodiments, the metadata provides millisecond values that correspond to key frame timestamps.

The key frame relevant metadata may be intermixed with other metadata, thereby necessitating scanning the contents of the moov section as part of step 230. Moreover, the key frames will be irregularly located within the media content encoded file and that different media content will be encoded with a more dense or sparse placement of key frames. In any case, the moov or metadata section contains the necessary information from which to extract or compute the key frame positions or timestamps. As a result, steps 220 and 230 can be performed with minimal computational effort and in a short period of time. Specifically, restricting the parsing and identification steps to the metadata increases the performance with which steps 220 and 230 are performed as the majority of the file information stored as part of the binary data in the mdat box is not processed.

Process 200 continues by mapping (at 240) a subset of the identified key frames to different segment start times based on the segment duration parameter. The mapping produces segments with lengths that deviate somewhat from the segment duration parameter, but that are as close as possible to the segment duration parameter based on the key frame locations within the original media content encoded file.

Some segments may be longer in duration than the segment duration parameter and other segments may be shorter in duration than the segment duration parameter. All segments start with a key frame that corresponds to a key frame in the original media content encoded file and some segments may span to include other key frames. The mapping step can be performed using any of several implementations or methodologies that result in segments commencing with a key frame from the original media content encoded file and have a duration approximate to the segment duration parameter.

Figure 3:
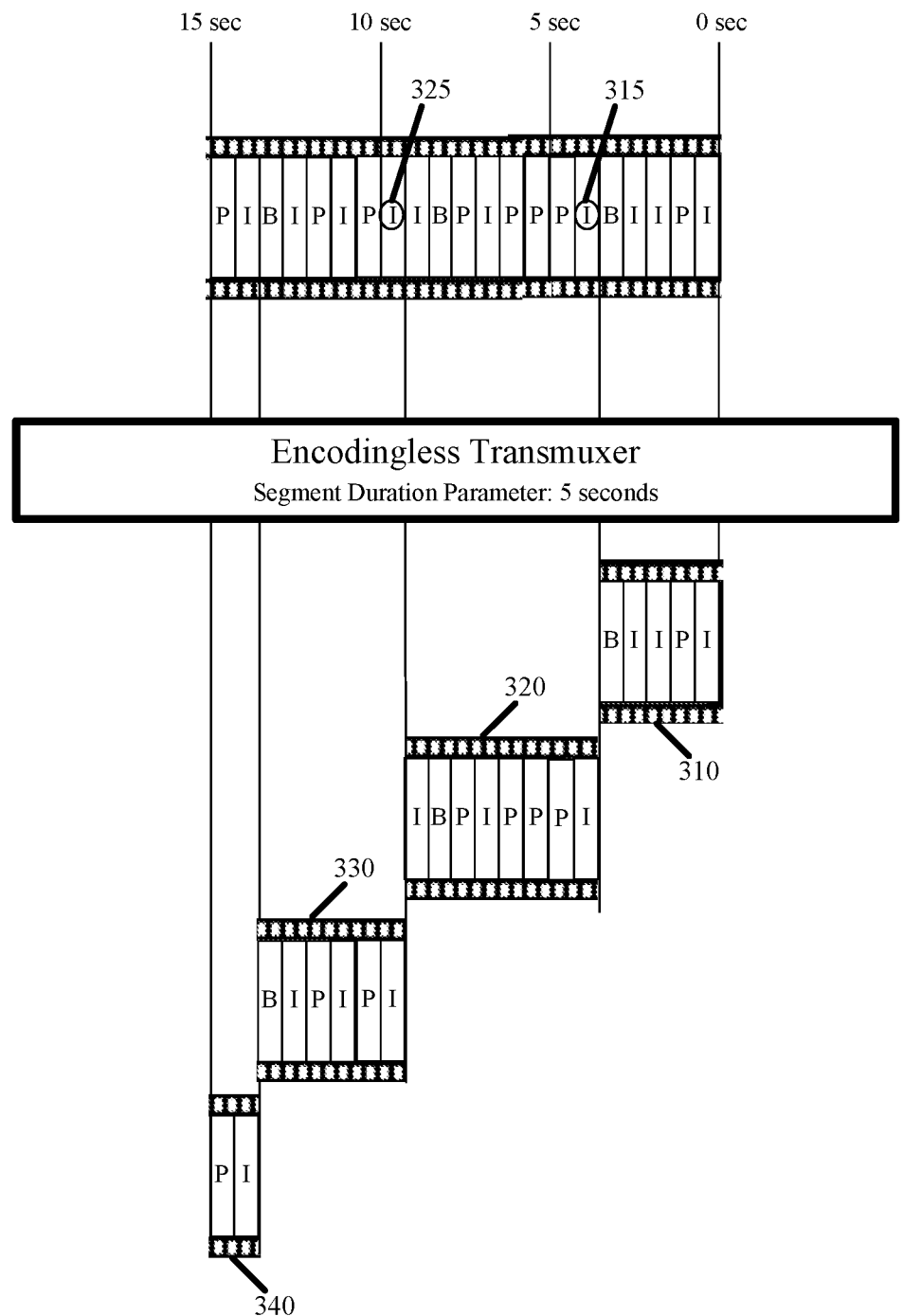
FIG. 3 presents media content key frame to segment start time mapping in accordance with the encodingless transmuxing of some embodiments.

FIG. 3 presents media content key frame to segment start time mapping in accordance with the encodingless transmuxing of some embodiments. In this figure and methodology, the segment duration parameter is configured to have a value of 5 seconds and the trasmuxing produces segments having durations that are closest to the sum of the previous segment starting key frame timestamp and the segment duration parameter.

There is no prior segment from which to key off the first segment 310. Accordingly, the transmuxing of FIG. 3 produces a first segment 310 commencing with the first key frame at the start of the media content file.

The transmuxing of FIG. 3 produces a second segment 320 commencing with a key frame having a timestamp closest to the first key frame timestamp summed with the segment duration parameter. The closest key frame for the second segment 320 can be one that comes before or after the sum of the first key frame timestamp and the segment duration parameter. In FIG. 3, the closest key frame for the second segment 320 (i.e., key frame 315) comes before the sum of the first key frame timestamp and the segment duration parameter.

The transmuxing of FIG. 3 produces a third segment 330 commencing with a key frame (i.e., key frame 325) having a timestamp closest to the second segment 320 starting key frame timestamp summed with the segment duration parameter. The mapping continues in this manner until the entire duration of the media content is partitioned into segments. As shown, the transmuxing segments the original media content encoded file into four segments 310, 320, 330, and 340.

As shown, some but not all key frames commence segments 310, 320, 330, 340 as a result of the mapping. Also, the different segments 310, 320, 330, 340 have different lengths.

Figure 4:
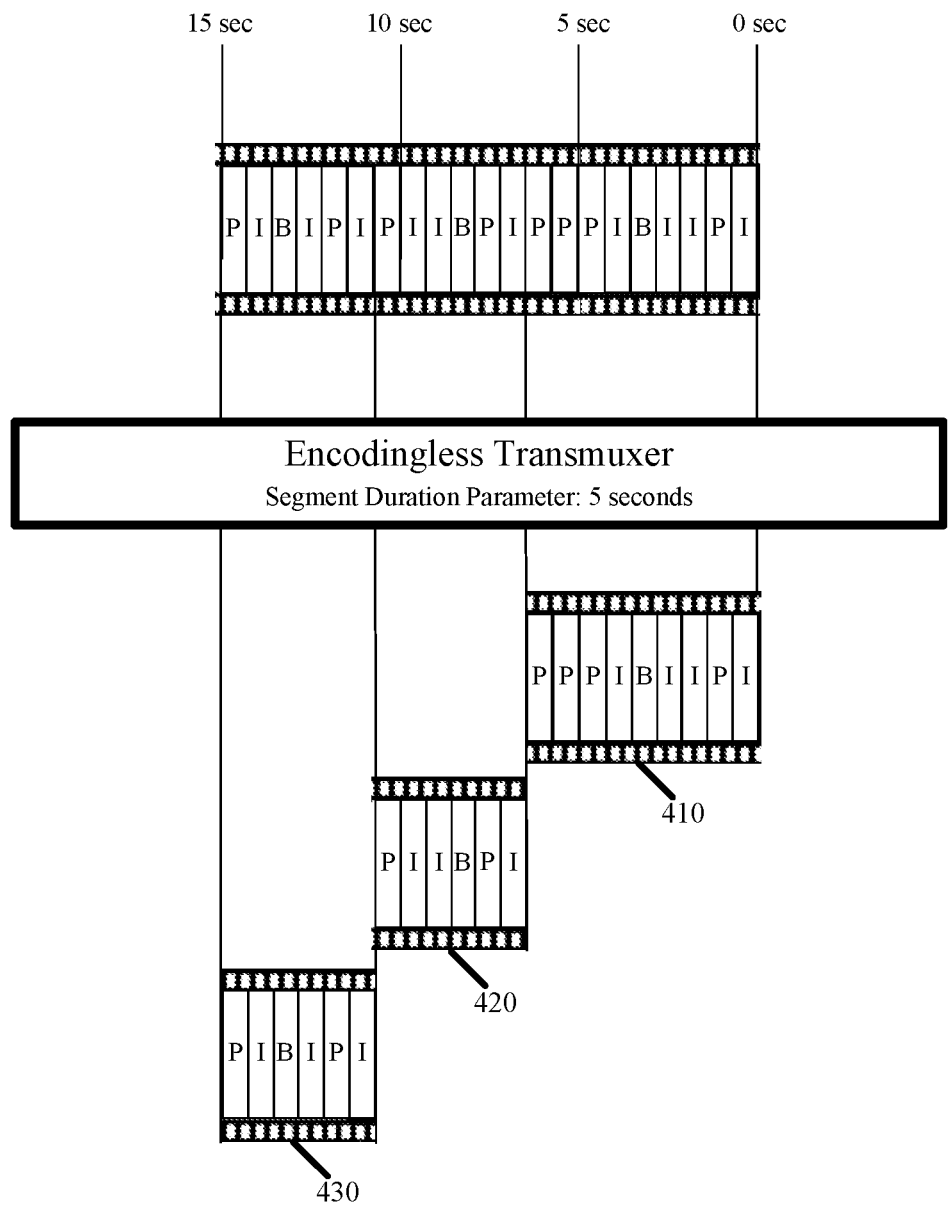
FIG. 4 presents an alternative media content key frame to segment start time mapping in accordance with the encodingless transmuxing of some embodiments.

FIG. 4 presents an alternative media content key frame to segment start time mapping in accordance with the encodingless transmuxing of some embodiments. In this figure and methodology, the segment duration parameter is configured to have a value of 5 seconds and the trasmuxing produces segments that key off the first key frame of the first segment 410 and a multiple of the segment duration parameter.

The transmuxing of FIG. 4 produces the first segment 410 to commence with the first key frame at the start of the media content file. The second segment 420 commences with a key frame having a timestamp that comes after but is closest to the first key frame timestamp summed with the segment duration parameter. The third segment 430 commences with a key frame having a timestamp that comes after but is closest to the first key frame timestamp summed with two segment duration parameters.

In FIG. 4 as in FIG. 3, the transmuxing does not produce segments that are of equal length and not all key frames in the original media content encoded file commence a segment. Moreover, some segments have lengths or durations greater than the segment duration parameter and other segments have lengths or durations less than the segment duration parameter.

FIGS. 3 and 4 illustrate two different implementations of the encodingless transmuxing for generating the segments. The embodiments can be adapted to perform other implementations whereby existing key frames within the original media content encoded file are reused in producing the segments. For instance, the transmuxing steps from FIGS. 3 and 4 can be combined to provide a third implementation.

According to the mapping of the identified key frames to the segment start times, the process then produces (at 250) the manifest file for the transmuxed stream. The process produces the manifest file in the format of the streaming protocol that will be used to stream the media content. For example, the process produces an m3u8 compliant manifest file when the media content is to be streamed using HLS, produces an mpd compliant manifest file when the media content is to be streamed using DASH, and produces an f4m compliant manifest file when the media content is to be streamed using HDS.

Figure 5:
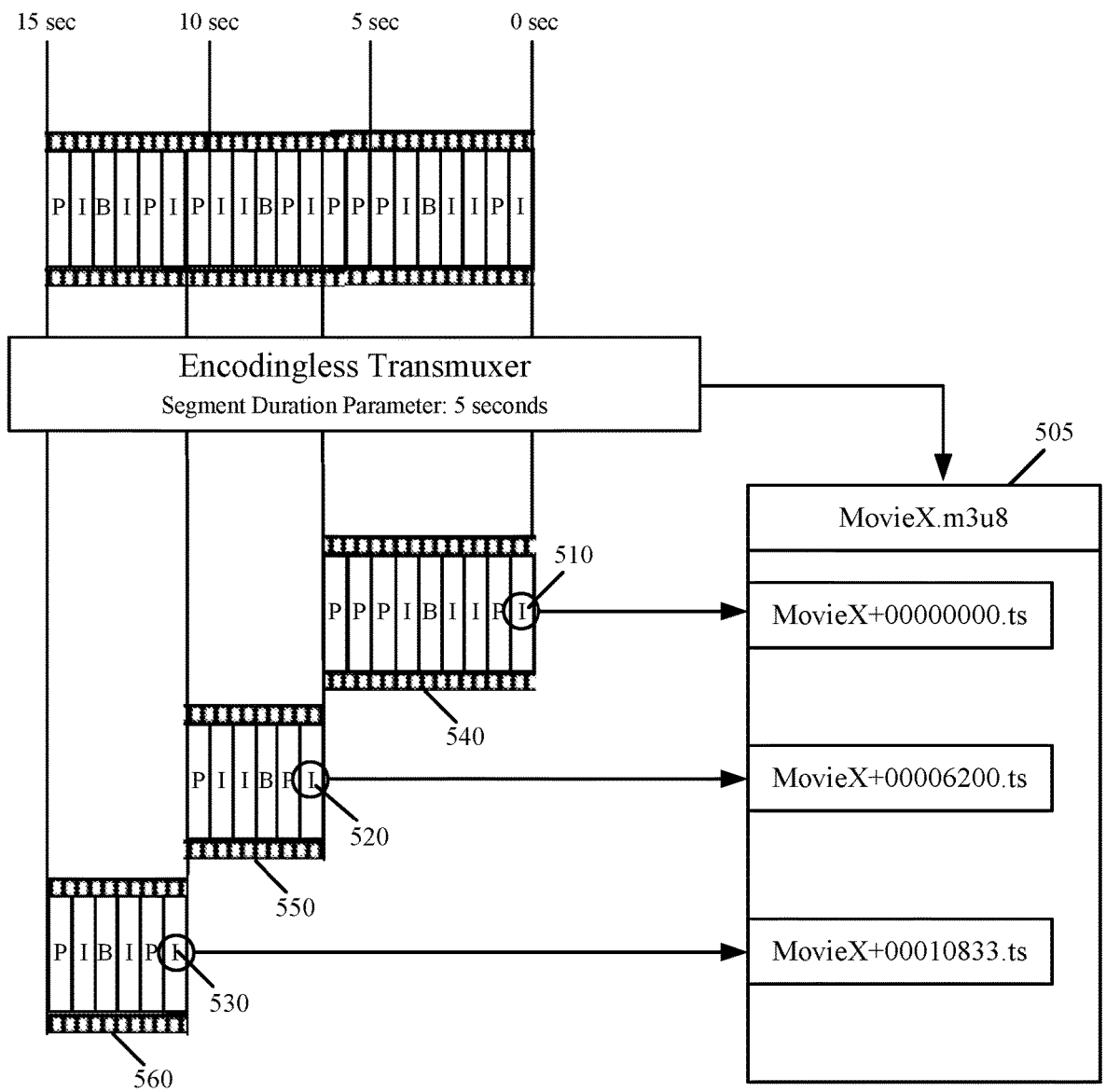
FIG. 5 conceptually illustrates producing a manifest file based on the mapping of identified key frames in an original media content encoded file to segment starts times in accordance with some embodiments.

FIG. 5 conceptually illustrates producing a manifest file 505 based on the mapping of identified key frames 510, 520, and 530 in an original media content encoded file to segment starts times in accordance with some embodiments. Per the mapping of FIG. 4, the encodingless transmuxer maps key frames 510, 520, and 530 from the original media content encoded file to start segments 540, 550, and 560.

The encodingless transmuxer identifies the time offsets or starting times of each segment from the metadata. The encodingless transmuxer then creates unique Uniform Resource Locators (URLs) or segment names with which a player can request each of the segments 540, 550, and 560. As shown, each segment name is formed by appending a timestamp corresponding to the millisecond start time of the corresponding segment key frame to the media content name. These URLs or segment names appended with the timestamps are then entered in order to the manifest file 505.

It should be noted that in producing a streaming protocol compliant manifest file, the encodingless transmuxer can insert information in addition to the segment URLs or segment names into the manifest file. The additional information can specify segment durations, resolutions, different audio tracks, and support for adaptive bitrates as some examples.

With reference back to process 200, the process sends (at 260) the manifest file to a client player or user requesting the media content. The client player then issues specific segment requests based on the URLs or segment names specified in the manifest file. If the client player is to start playback from the beginning of the media content, the client player will request the first segment specified in the manifest. If the client player is to start playback at some time after the beginning of the media content, the client player identifies the segment spanning the desired time before issuing a request for the identified segment.

Any client player request for a segment specified in the manifest includes the timestamp for the key frame at which the segment commences. The timestamp included with the request allows the encodingless transmuxer or other server to readily identify the starting bit for the binary data subset that corresponds to the segment start time. This then allows the encodingless transmuxer or other server to respond to the client player request by serving the binary data for the requested segment directly from the binary data of the original media content encoded file. In doing so, the encodingless transmuxer or other server can generate requested segments on-the-fly or in real-time with minimal processing effort. In some embodiments, the encodingless transmuxer pregenerates the segments from the original media content encoded file before the segments are requested by users to avoid the on-the-fly generation.

In either case, whether producing segments on-the-fly upon request or pregenerating, the process produces each segment specified in the manifest file directly from the binary data of the original media content encoded file without any further encoding, decoding, modification, or manipulation of the binary data, or changing of the frame information from the original media content encoded file. With respect to producing a particular segment, the process copies or reuses (at 270) from the original media content encoded file, the binary data for the key frame that commences the particular segment up to the bit immediately before the start of the key frame for the next segment.

The process constructs (at 280) metadata for the particular segment. The metadata provides the information the client player needs to decode and render the subset of binary data that is copied to the particular segment. The metadata can be constructed from copying a subset of metadata from the original media content encoded file. The copied metadata include the resolution, frames per second, bytes or bits per frame, etc. for the frames within the particular segment. The encodingless transmuxer can also generate other parts of the particular segment metadata from existing metadata of the original media content encoded file. In some embodiments, constructing the metadata involves generating key frame locations and frame offsets for the frames of the particular segment. Since the length of the particular segment will be only a few seconds, the scanning and metadata construction occurs with minimal processing effort, especially since there is no encoding of the binary data for the actual frame information contained in the particular segment.

The process formats (at 285) the particular segment to conform with the streaming protocol with which the segment is streamed to a requesting user. The process then caches (at 290) the particular segment or sends the particular segment in response to a client player or user request for the particular segment.

Figure 6:
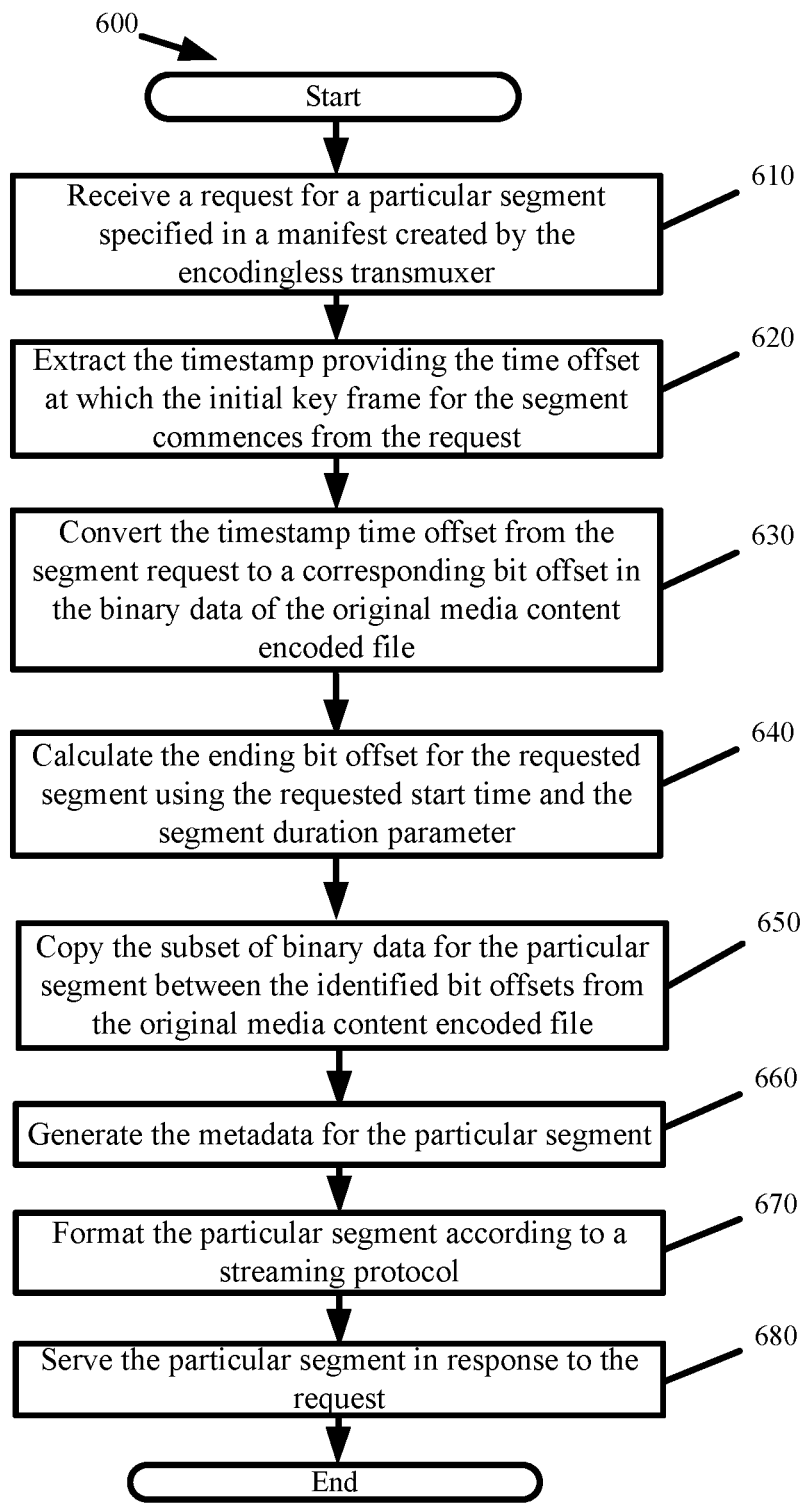
FIG. 6 presents a process for producing and serving a requested segment in accordance with some embodiments.

FIG. 6 presents a process 600 for producing and serving a requested segment in accordance with some embodiments. Process 600 can be performed by the encodingless transmuxer or a streaming server tasked with distributing the segments of the media content to different client players or users. In other words, the manifest file creation and the serving of the actual segments can be completed by the same or different machines or servers.

The process commences with a streaming server receiving (at 610) a request for a particular segment specified in a manifest created by the encodingless transmuxer in accordance with the above described embodiments. The process extracts (at 620) from the request, the timestamp providing the time offset at which the initial key frame for the segment commences. In some embodiments, the request is specified as part of a HyperText Transfer Protocol (HTTP) GET request. The timestamp extraction involves parsing the request header in order to obtain the request URL before separating the timestamp from the segment name specified as part of the URL path.

The process converts (at 630) the timestamp time offset from the segment request to a corresponding bit offset in the binary data of the original media content encoded file. The conversion is performed with reference to the metadata of the original media content encoded file. In some embodiments, the metadata specifies the frames per second and a number of bytes for each frame. Using these values and the timestamp time offset, the process can determine the precise bit at which the key frame for the requested segment commences. For example, if a requested segment specified a timestamp of one second and there were thirty frames per second with half the thirty frames being two bytes in size and the other half being one byte in size, then the server can compute the starting bit for the segment to be at the $360^{th}$ bit ((15*2+15*1)*8).

The process then determines the last bit of the requested segment binary data or the binary data bit of the original media content encoded file corresponding to the end of the requested segment. The process calculates (at 640) the ending bit offset for the requested segment using the requested start time, the segment duration parameter, and metadata of the origin media content encoded file. In some embodiments, the calculation involves deriving the timestamp time offset for the segment that immediately comes after the requested segment and converting the timestamp of the segment following the requested segment to a corresponding bit offset in the binary data of the original media content encoded file. Here again, the conversion involves referencing the original media content encoded file metadata to identify the binary data bit offset.

The process directly copies (at 650) the subset of binary data falling between and including the starting and ending bit offsets from the original media content encoded file, wherein the starting bit offset corresponds to the first binary data bit at which the key frame for the requested segment commences and the ending bit offset corresponds to the last binary data bit immediately before the bit for the key frame at which the next segment commences. This copy operation generates the requested segment without encoding, decoding, or otherwise modifying the subset of binary data from the file.

Figure 7:
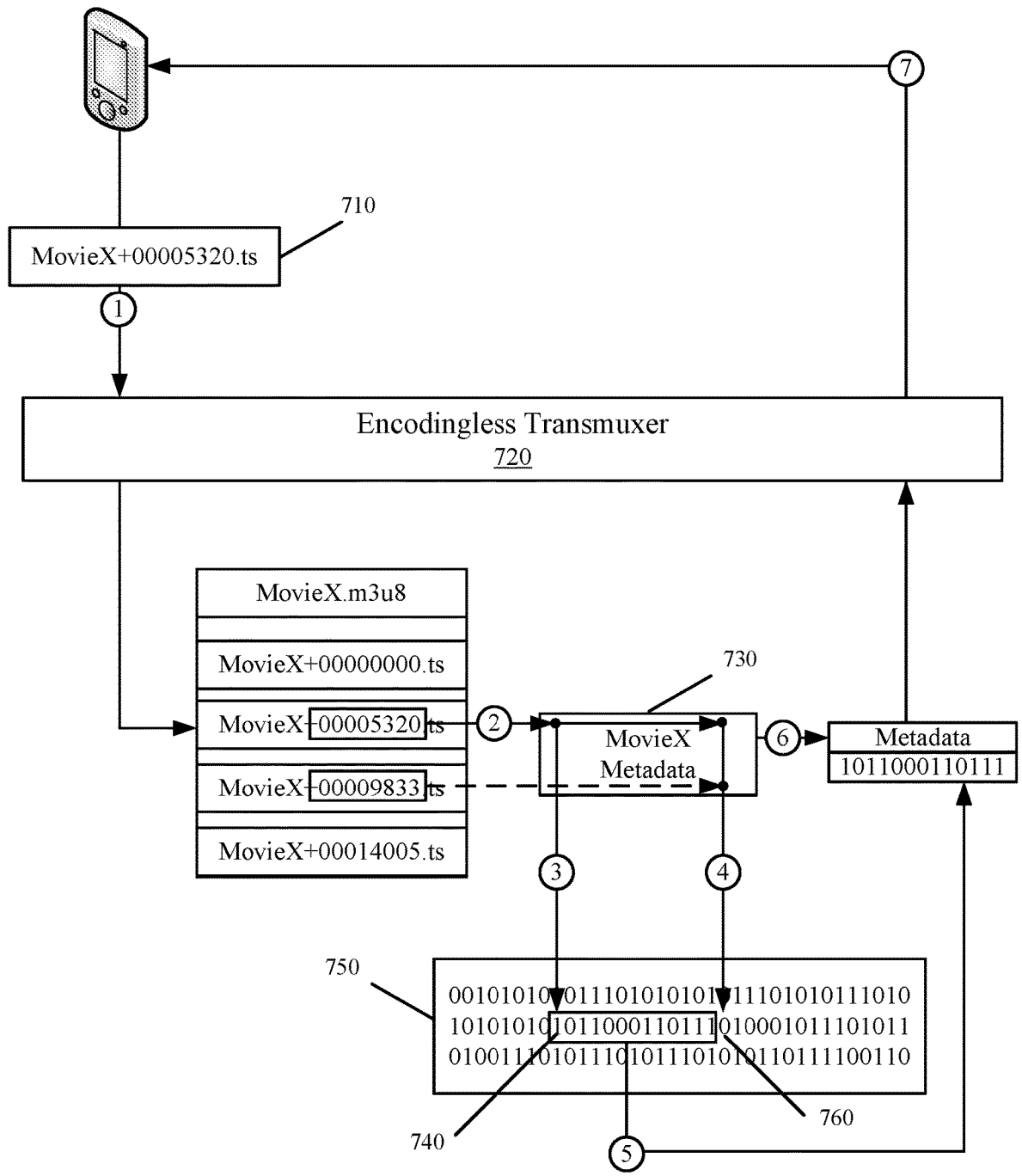
FIG. 7 conceptually illustrates generating a segment in response to a user request for the segment without encoding any part of the segment.

As with steps 280 and 285 of process 200, the process generates (at 660) the metadata for the segment and formats (at 670) the segment for the streaming protocol that will be used to send the segment to the requesting client player or user. FIG. 7 conceptually illustrates generating a segment in response to a user request for the segment without encoding any part of the segment.

The figure illustrates an incoming user request 710 that specifies a millisecond offset of 5320 for particular media content. The encodingless transmuxer 720 retrieves the original encoded file of the particular media content. The encodingless transmuxer 720 scans the metadata 730 of the file to determine the binary data bit 740 in the mdat section of the particular media content file 750 that corresponds to the millisecond offset for the key frame of the requested segment. The encodingless transmuxer 720 then copies the binary data from the identified binary data bit 740 up to the bit 760 corresponding to the start of the key frame for the next segment.

The encodingless transmuxer 720 then constructs the metadata for the newly produced segment. As noted above, the encodingless transmuxer 720 can reuse metadata from the original encoded file and/or generate new metadata in constructing the metadata for the newly produced segment.

With reference back to FIG. 6 and in response to the request received at 610, the process serves (at 680) the formatted segment to the requesting device according to a particular streaming protocol. The requesting device will receive the particular segment. The requesting device will decode the binary data payload according to the specific metadata. As part of the decoding operation, the requesting device renders the frames in order to playback, on the requesting device, the portion of the media content contained in the particular segment. As the client player progresses in its playback of a particular stream, the client player will reference the manifest file to identify and request ahead the upcoming segments and the encodingless transmuxer or streaming server will supply the requested segments according to FIG. 6 or similar process.

The client player can enable forwarding and rewinding functionality to move ahead or behind the current playback time. Should the amount of forwarding or rewinding extend past the frames of the received segment, the client player can again access the manifest to identify the segment containing the playback position resulting from the forwarding or rewinding and then request the identified segment as the next segment. If the start time of the requested segment does not align with the desired playback position, the client player can obscure the rendering of frames until the desired position is reached. In other cases, the client player begins playback with the first frame of the receiving segment even if the playback time is misaligned with the desired playback time. In some embodiments, the segments are a few seconds in length such that any misalignment is negligible or unnoticeable. For example, if the segments are four seconds in length and the user requests playback at the third second of a segment, the client player can harmlessly render the three seconds before the desired position with little impact to the user experience.

The embodiments involve no change to the supported streaming protocols or the client players used to request media content. Moreover, the embodiments present the transmuxed segments on a variety of client player devices without the need to encode or modify any part of the original media content encoded file from which the segments are produced.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
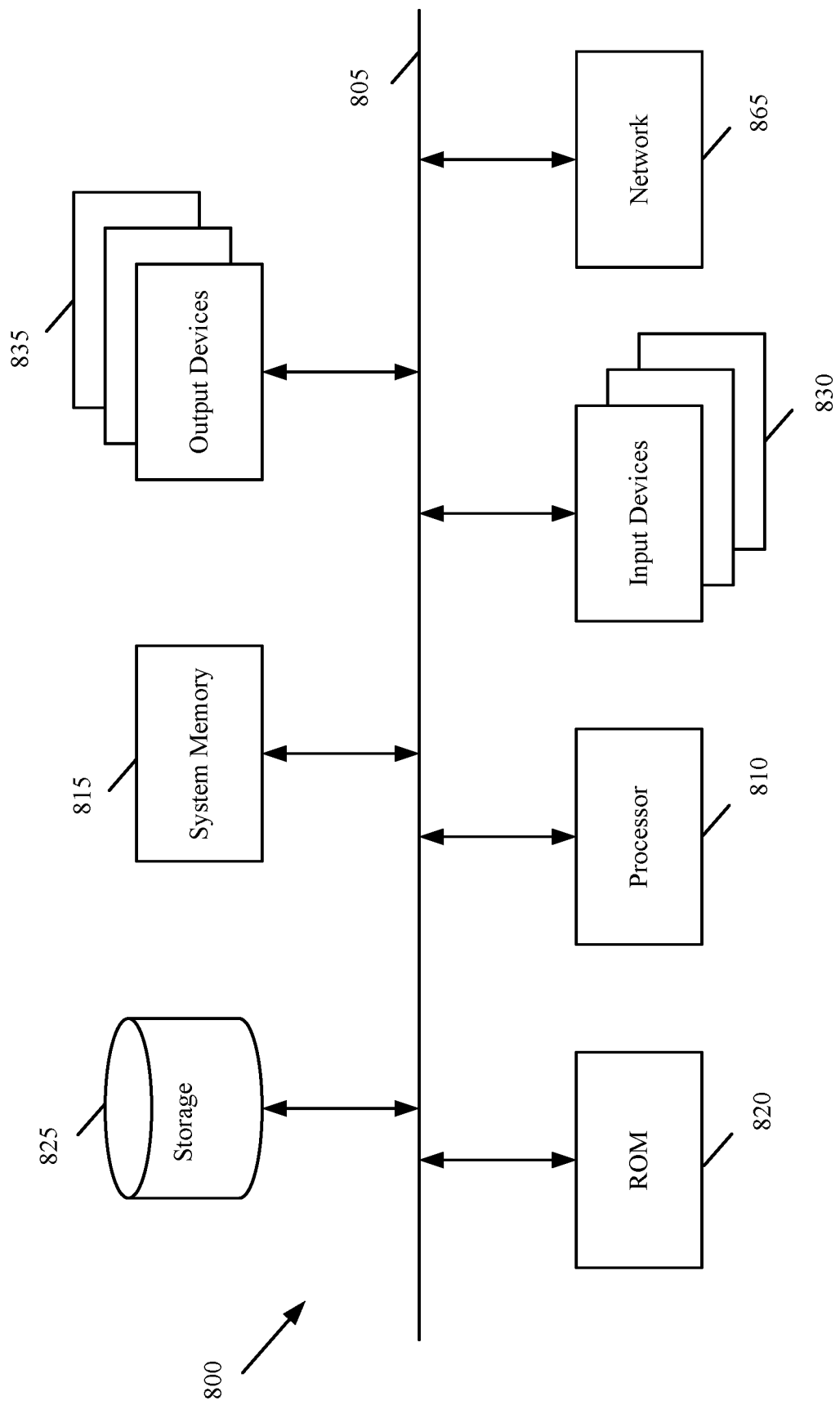
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., encodingless transmuxer or streaming server). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments use a mass-storage device (such as a magnetic, solid-state, or optical disk) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method comprising:
obtaining a single file encoding media content, the single file comprising metadata and binary data, wherein the binary data stores frame information for a plurality of frames representing the media content, and wherein the plurality of frames comprises a set of key frames irregularly intermixed with other frame types;
detecting positions of first, second, and third key frames of the set of key frames from said metadata;
transmuxing the single file into a plurality of segments based on a segment duration parameter, wherein said transmuxing comprises:
commencing a first segment of the plurality of segments with the first key frame;

determining that the third key frame is closer than the second key frame to a position that is the segment duration parameter from the first key frame in the media content, and wherein the third key frame is at a different position in the media content than the position that is the segment duration parameter from the first key frame;

commencing a second segment of the plurality of segments with the third key frame, wherein the second segment immediately follows said first segment during playback of the media content;

serving the first segment in response to a user request for the first segment, wherein said serving comprises providing a subset of the binary data without encoding, decoding, or modifying two or more frames falling within the subset of the binary data, wherein the subset of the binary data commences at binary data encoding the first key frame, spans binary data encoding the second key frame and other frames between the first key frame and the third key frame, and ends with a frame immediately before binary data encoding the third key frame.

2. The method of claim 1, wherein each of the first, second, and third key frames correspond to different I frames, and wherein each I frame can be rendered without referencing information from other frames from the plurality of frames.

3. The method of claim 1 further comprising serving the second segment in response to a user request for the second segment, wherein serving the second segment comprises providing a nonoverlapping second subset of the binary data, wherein the second subset of the binary data commences from binary data encoding the third key frame and continues to a frame immediately before binary data encoding a next key frame from the set of key frames that is closest to a position that is the segment duration parameter from the third key frame in the media content.

4. The method of claim 3, wherein the second segment comprises at least a fourth key frame from the set of frames and one or more other frames from the plurality of frames encoded between the third key frame and the next key frame.

5. The method of claim 1, wherein the first segment and the second segment are of different durations, and wherein the first segment and the second segment include a different number of frames from the plurality of frames.

6. The method of claim 1 further comprising generating a manifest file comprising a first entry with a first value corresponding to a starting position of the first key frame in the binary data.

7. The method of claim 6 further comprising adding a second entry to the manifest file for the second segment by introducing a second value, after the first value, that corresponds to a starting position of the third key frame in the binary data.

8. The method of claim 7, wherein the first value and the second value comprise different timestamps that align with a playback position of the first key frame and the third key frame respectively in the media content.

9. The method of claim 1 further comprising retrieving the segment duration parameter as a first segment duration interval from a content provider originating said media content, wherein the first segment duration interval specifies an approximate length of each segment of the plurality of segments.

10. The method of claim 9 further comprising transmuxing second media content of a different second content provider according to a second segment duration interval provided by the second content provider, wherein the second segment duration interval is different than the first segment duration interval.

11. The method of claim 10, wherein segments of the second media content, that result from said transmuxing of the second media content, each have a duration within a first range of durations around the second segment duration interval, and wherein the plurality of segments, that result from said transmuxing of the single file, each have a duration within a different second range of durations around the first segment duration interval.

12. The method of claim 1, wherein the metadata corresponds to a first portion of the single file that is stored separately from a second portion of the single file corresponding to the binary data.

13. The method of claim 1, wherein said transmuxing further comprises dynamically generating the first segment from an existing encoding of the binary data.

14. A device comprising:
a non-transitory computer-readable medium storing a set of processor-executable instructions; and
one or more processors configured to execute the set of processor-executable instructions, wherein executing the set of processor-executable instructions causes the one or more processors to:
obtain a single file encoding media content, the single file comprising metadata and binary data, wherein the binary data stores frame information for a plurality of frames representing the media content, and wherein the plurality of frames comprises a set of key frames irregularly intermixed with other frame types;
detect positions of first, second, and third key frames of the set of key frames from said metadata;
transmux the single file into a plurality of segments based on a segment duration parameter by:
commencing a first segment of the plurality of segments with the first key frame;
determining that the third key frame is closer than the second key frame to a position that is the segment duration parameter from the first key frame in the media content, wherein the third key frame is at a different position in the media content than the position that is the segment duration parameter from the first key frame;
commencing a second segment of the plurality of segments with the third key frame, wherein the second segment immediately follows said first segment during playback of the media content;
serve the first segment in response to a user request for the first segment, wherein said serving comprises providing a subset of the binary data without encoding, decoding, or modifying two or more frames falling within the subset of the binary data, wherein the subset of the binary data commences at binary data encoding the first key frame, spans binary data encoding the second key frame and other frames between the first key frame and the third key frame, and ends with a frame immediately before binary data encoding the third key frame.

15. The device of claim 14, wherein the processor-executable instructions further include processor-executable instructions to serve the second segment in response to a user request for the second segment by providing a non-overlapping second subset of the binary data, wherein the second subset of the binary data commences from binary data encoding the third key frame and continues to a frame immediately before binary data encoding a next key frame from the set of key frames that is closest to a position that is the segment duration parameter from the third key frame in the media content.

16. The device of claim 14, wherein the processor-executable instructions further include processor-executable instructions to generate a manifest file comprising a first entry with a first value corresponding to a starting position of the first key frame in the binary data.

17. The device of claim 16, wherein the processor-executable instructions further include processor-executable instructions to add a second entry to the manifest file for the second segment by introducing a second value, after the first value, that corresponds to a starting position of the third key frame in the binary data.

18. The device of claim 14, wherein the processor-executable instructions further include processor-executable instructions to retrieve the segment duration parameter as a first segment duration interval from a content provider originating said media content, wherein the first segment duration interval specifies an approximate length of each segment of the plurality of segments.

19. The device of claim 18, wherein the processor-executable instructions further include processor-executable instructions to transmux second media content of a different second content provider according to a second segment duration interval provided by the second content provider.

20. A non-transitory computer-readable medium, storing a set of processor-executable instructions, which, when executed by one or more processors, cause the one or more processors to:
   obtain a single file encoding media content, the single file comprising metadata and binary data, wherein the binary data stores frame information for a plurality of frames representing the media content, and wherein the plurality of frames comprises a set of key frames irregularly intermixed with other frame types;
   detect positions of first, second, and third key frames of the set of key frames from said metadata;
   transmux the single file into a plurality of segments based on a segment duration parameter by:
      commencing a first segment of the plurality of segments with the first key frame;
      determining that the third key frame is closer than the second key frame to a position that is the segment duration parameter from the first key frame in the media content, wherein the third key frame is at a different position in the media content than the position that is the segment duration parameter from the first key frame;
      commencing a second segment of the plurality of segments with the third key frame, wherein the second segment immediately follows said first segment during playback of the media content;
   serve the first segment in response to a user request for the first segment, wherein said serving comprises providing a subset of the binary data without encoding, decoding, or modifying two or more frames falling within the subset of the binary data, wherein the subset of the binary data commences at binary data encoding the first key frame, spans binary data encoding the second key frame and other frames between the first key frame and the third key frame, and ends with a frame immediately before binary data encoding the third key frame.

* * * * *